(12) United States Patent  
Dujarric (10) Patent No.: US 7,106,863 B2  
(45) Date of Patent: Sep. 12, 2006

(54) METHOD FOR POSITIONING BY SATELLITES

(75) Inventor: Christian François Michel Dujarric, Paris (FR)

(73) Assignee: Agence Spatiale Europeenne, Paris (FR)

( * ) Notice: Subject to any disclaimer, the term of this patent is extended or adjusted under 35 U.S.C. 154(b) by 775 days.

(21) Appl. No.: 09/852,729

(22) Filed: May 11, 2001

(65) Prior Publication Data

US 2002/0006201 A1  Jan. 17, 2002

(30) Foreign Application Priority Data

May 12, 2000  (FR)  .................................. 00 06369

(51) Int. Cl.
  *H04K 1/00* (2006.01)
  *B60R 25/10* (2006.01)
  *H04M 1/66* (2006.01)
  *H04Q 7/20* (2006.01)
  *G01C 21/28* (2006.01)
  *H04B 7/14* (2006.01)

(52) U.S. Cl. ....................... 380/258; 380/270; 701/213; 701/215; 455/411; 455/430; 340/426.19

(58) Field of Classification Search ................ 380/258, 380/255, 270; 342/357.01, 357.07, 357.12, 342/357.06; 713/155, 171, 168; 455/430, 455/411; 701/213, 215; 340/426.19
See application file for complete search history.

(56) References Cited

U.S. PATENT DOCUMENTS

| | | | | |
|---|---|---|---|---|
| 5,113,443 A | * | 5/1992 | Brockman | .................. 380/270 |
| 5,612,682 A | * | 3/1997 | DeLuca et al. | ............. 455/411 |
| 5,982,897 A | * | 11/1999 | Clark | ......................... 380/258 |
| 5,987,139 A | * | 11/1999 | Bodin | ........................ 455/411 |
| 5,995,040 A | | 11/1999 | Issler et al. | |
| 6,031,487 A | | 2/2000 | Mickelson | |
| 6,100,806 A | * | 8/2000 | Gaukel | .................. 342/357.01 |
| 6,317,500 B1 | * | 11/2001 | Murphy | ...................... 380/258 |
| 6,429,808 B1 | * | 8/2002 | King et al. | ............ 342/357.02 |
| 6,621,452 B1 | * | 9/2003 | Knockeart et al. | .......... 701/214 |

* cited by examiner

Primary Examiner—Matthew Smithers
Assistant Examiner—Courtney Fields
(74) Attorney, Agent, or Firm—Oblon, Spivak, McClelland, Maier & Neustadt, P.C.

(57) ABSTRACT

The invention relates to a security-protected system for positioning by satellites, comprising a constellation of satellites (11) sending out positioning signals under the control of a set of ground stations (14). A user receiver of the said positioning signals comprises means for sending, to a ground station, a request calling for a key which is necessary for interpreting them, advantageously accompanied by a recopy of the positioning signals received. User servicing ground stations comprise means for receiving this request, calculating the position of the user and verifying whether the user possesses a privileged status, and means for addressing the said key to the user receiver, in the event that the verification is positive, this key further comprising means for interpreting the positioning signals with the aid of the key so as to deduce his own position therefrom.

20 Claims, 9 Drawing Sheets

METHOD FOR POSITIONING BY SATELLITES

The subject of the present invention is a method of positioning by satellites. A further subject is a system for positioning by satellites including all means suitable for implementing this method. This system can be likened to a satellite-navigation system such as the GPS system, to the extent that it includes a constellation of satellites delivering positioning signals under the control of a set of ground stations. It is designed, however, to allow selective monitoring of the users who interpret these signals in order for each to determine his own position, in time and space, and to provide a defined quality of service, advantageously implying guarantees of availability of the signals and/or of precision of the position information calculated on the basis of them, while making it possible to reserve the interpretation of the corresponding signals for specially selected users, while depriving the other users of this interpretation.

BACKGROUND OF THE INVENTION

Figure 1:
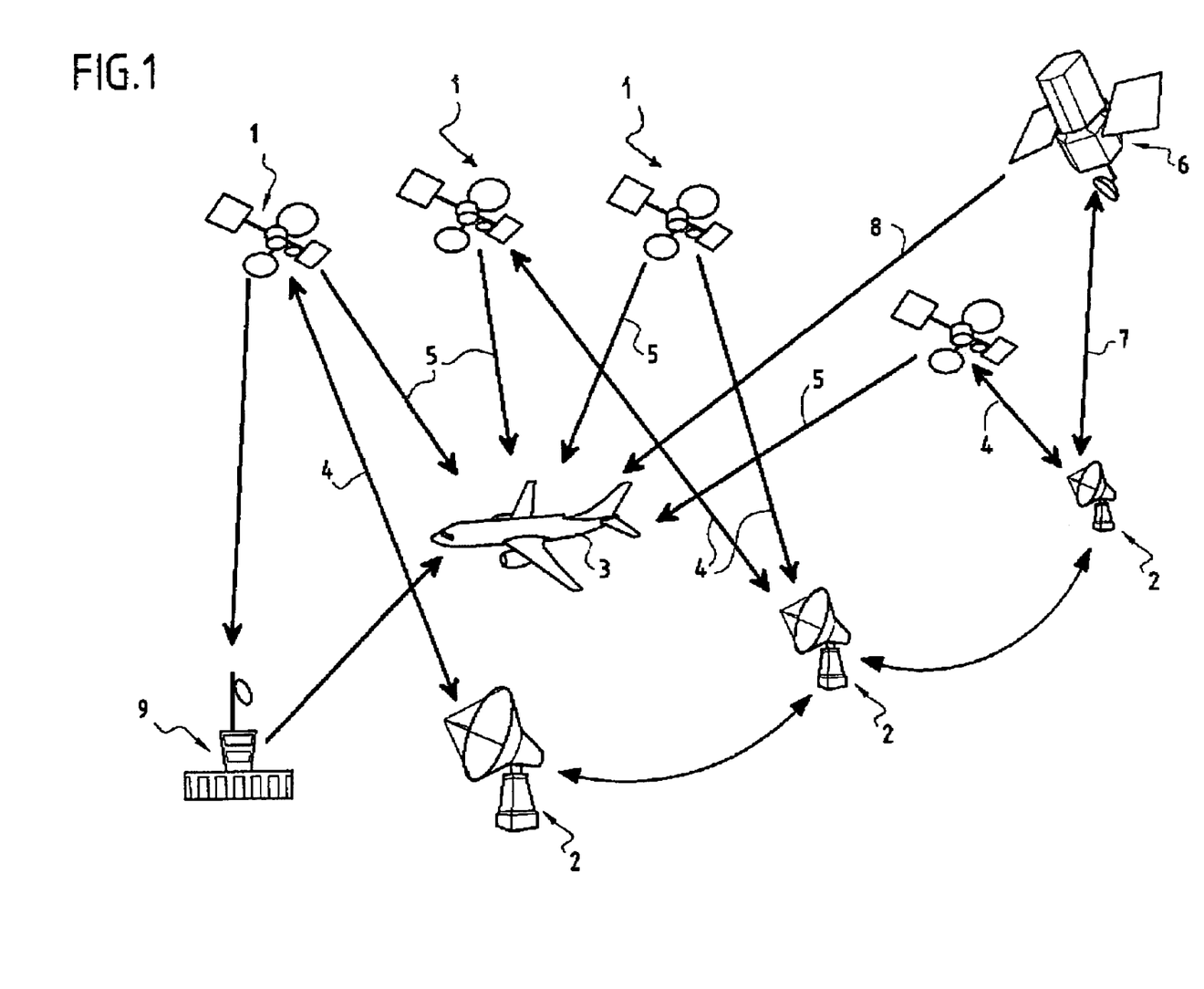
FIG. 1, already described, illustrates a satellite-navigation system of the type known in the state of the art.

The known types of systems for satellite navigation on the global scale, and more particularly the system known as GPS (for "Global Positioning System"), comprise, as shown in FIG. 1 placed at the end of the present description, a constellation of satellites 1, in orbit around the Earth, which are in communication with ground control stations 2, in order to make navigation signals available to user receivers 3.

The various satellites 1 are synchronized with each other by the control stations 2, which are themselves linked together. These stations calculate the orbital parameters of the satellites and transmit them to them, as shown symbolically by the arrow 4, by way of the stations 2.

The signals sent out by the satellites 1 comprise, in essence, positioning and time data. As illustrated diagrammatically by the arrow 5, a user receiver 3 picking up these positioning signals as sent out by at least four separate satellites deduces therefrom the exact time and his exact position with respect to the satellites 1 at the instant of the measurement and, from that, his absolute position with respect to any ground reference system.

In practice, at least for the American GPS system, the precision on the position information obtained can be limited at any moment to about a hundred meters by scrambling of the signals which is deliberately imposed by the American military authorities, and, even when the precision available is of the order of about ten meters in the case of civil users, it remains inferior to that available to the military users.

It has also been proposed to add to these systems geostationary satellites 6 capable, moreover, of directly relaying (arrows 7, 8) information delivered by the ground control stations 2 to the user receivers 3.

Finally, the system may also include "pseudolite" ground stations 9, that is to say ground stations the position of which is known accurately in a local environment and which, as regards a user arriving close by, behave in the scheme of things like a satellite. These stations, via differential measurements, make it possible locally to increase the precision of the position down to less than ten meters, this for non-military users. These may include, for example, a station in proximity to a runway receiving the navigation signals (or positioning signals) sent out by the satellites in order to determine any positioning error which the user receiver will have to correct and to relay the information to the latter.

One major defect of satellite navigation systems is that the users cannot count on any guarantee as to the quality of the service offered, neither as regards the precision of the information received nor as regards the very availability of the signals. This is because the receivers necessary for interpreting the signals sent out by the satellites are freely available on the market, such that, in normal times, the system can be used by anyone who possesses such a receiver, without it being possible to verify what use is made of it. It results therefrom that it always has to be feared that a manager of the system might modify its operation, or even go as far as cutting it off completely, as the Armed Forces could do, for example, in times of crisis, without restricting themselves to reserving increased precision by comparison with civil users.

Assured availability of the signal with a known precision better than 10 meters would, however, be currently necessary, outside the military field, for many professional activities, such as the landing of aircraft in poor visibility conditions, or maritime navigation in ports or shallow waters. The known satellite navigation systems do not make it possible to satisfy these users. In consequence, the use of a system such as the existing GPS system, for example, is not currently allowable as a single means of navigation for operations having a safety-critical character. A limited use is permitted only with the support of conventional navigation facilities.

From the absence of an assurance of availability of the signals, as well as from the absence of a guaranteed precision (it is variable and unknown to the user), there also result drawbacks of an economic nature. This is because the GPS system has no provision for making it possible to have the use of the service paid for. This results, furthermore, from the fact that it is not possible to know who is using the system.

Finally, even for the military users, protection against unauthorized accesses depends largely on the degree of protection of the military receivers and of the access codes. It is not possible to know whether these codes have not been violated and whether unauthorized users are using the system with the aid of these violated codes.

SUMMARY OF THE INVENTION

The present invention aims to remedy the drawbacks of the satellite navigation systems and methods such as those which have just been reiterated, taking the American GPS system as an example. To that end, it consists essentially in defining a special category of privileged users, for whom there is reserved privileged access to a service of specific quality, translating especially into security of availability of positioning signals which they know how to interpret. It provides the means necessary for these privileged users to be able to have access to the interpretation of the positioning signals broadcast by the constellation of satellites, on condition, however, of having received an interpretation key that supplies an access-authorization command specially derived for their purposes. It also makes provision to allow a manager of the system to monitor that the use of the system by the users thus authorized remains in accordance with predetermined conditions. Such conditions may be, especially, those of complying with a route plan, possibly incorporated into a more complete mission, which, for each user, is declared to the manager of the system and then taken into account every time this user applies to use his access privilege, advantageously via a request which he sends periodically to a ground station in the guise of a call to learn the interpretation key of the moment, matched to his particular situation and to his rights.

Thus the object of the invention is especially a method for positioning by satellites, to be implemented in a navigation installation including a constellation of satellites orbiting around the Earth and emitting out positioning signals under the control of a set of ground stations from which they receive control signals, these positioning signals being available for being received by user receivers, which method comprises:

emitting, from said set of ground stations, periodically renewed direct transformation functions which are addressed respectively to each said satellite of said satellite constellation and applying the direct transformation function received by each satellite to ercode the positioning signals emitted therefrom;

and further, upon each request from a user receiver addressed to a user servicing station, verifying that it has right to a privileged-user status and, in the event that the verification is positive, addressing to said user receiver reverse transformation functions that are inverse to the direct transformation functions applied at the satellites from which it receives positioning signals, whereby said reverse transformation functions constitute an interpretation key for interpreting said positioning signals by applying said reverse transformation functions for decoding them.

In the context of this method, the set of reverse transformation functions which are of use at a defined instant to the privileged-user receiver in question, as a function especially of its situation, constitutes what is called here a key for interpreting the positioning signals, and the above "request" represents a call to be sent this key in order to be able to apply it to the positioning signals received for interpretating their coded form as "transformed" by the direct transformation functions.

It will be observed that, in the preceding definition, it is not intended by "periodically" that the operations in question are repeated at regular time intervals. On the contrary, the period of validity of each transformation function will preferably be variable, in a random way if appropriate.

It will be observed, furthermore, that the notion of "navigation" does not necessarily imply that there is actual movement of the user receiver of any privileged user. The method according to the invention is in effect completely applicable, for example, in the field of oil prospecting and extraction, to semi-submersible platforms or ships with dynamic positioning.

A further subject of the invention is a positioning system in a security-protected system for assistance with navigation, comprising a constellation of satellites in orbit around the Earth, each including means for sending out positioning signals deduced from control signals which they receive from a set of ground stations also in communication with each other, characterized in that, for at least one user receiver including means for acquisition of the said positioning signals with a view to interpreting them in order to calculate position information, the said user receiver further comprises sending means for sending, to the said set of ground stations, a call request to receive an interpretation key which is necessary for it to take advantage of a reserved privilege of interpreting the said positioning signals, and in that the said set of ground stations includes at least one station called user servicing station including receiving means for receiving the said request, calculating means for verifying, from the said request, whether the user possesses privileged-user status giving him rights to the said privilege, and sending means for addressing the said interpretation key to the said receiver, in the event that the verification is positive.

For interpreting the positioning signals detected from the satellites, each privileged-user receiver then comprises means for receiving the interpretation key which the services station addresses to it in response to its request, and calculating means for combining the transformed positioning signals received from the satellites with the said interpretation key in order to deduce therefrom the information on its position.

According to another characteristic specific to the invention, the system, within a master station among the set of stations for control of the constellation of satellites, includes:

means for generating the direct transformation functions to be applied by the satellites in deriving positioning signals and addressing them to the various satellites for which they are respectively intended, in addition to the usual control signals which are, especially, their orbital parameters and synchronization information, as well as means for calculating the transformation functions which are the inverse of the preceding ones and for broadcasting them to the various user servicing stations which the system may include, for the purposes of deriving and transmission of the interpretation key necessary to each user who presents a request to that effect, subject to the verification that he has rights to the privileged-user status.

The invention extends, needless to say, to the devices and apparatus which include means which are appropriate with a view to their use in a satellite-navigation system allowing implementation of the method according to the invention as defined above, possibly involving privileged users in at least one geographical area covered by the system.

Thus, a further subject of the invention is especially a user receiver characterized in that, in addition to means for acquisition of positioning signals from a plurality of satellites within its range, it includes sending means for sending a request, intended for a user servicing ground station, calling for a key for interpreting the said positioning signals, the said key being physically represented by transformation functions which are the inverse of direct transformation functions which are applied respectively by the various satellites in its range for sending corresponding positioning signals, and in that it further includes calculating means for processing the said positioning signals having undergone the direct transformation functions by applying to them the corresponding inverse functions resulting from the said interpretation key and for deducing therefrom position information obtained by interpreting the said positioning signals.

It should be noted that the system according to the invention is not necessarily permanently in operation under the conditions for application of the method which reserve access to the calculation of the position information to the privileged users. On the contrary, provision is advantageously made, in practice, for the system to be brought into operation alternately according to several different modes.

As a typical example here, the case can be taken in which circumstances external to the system proper justify a situation of military crisis as opposed to a situation which may be called peacetime. In peacetime, the transformation function will advantageously be equal to the "identity" function, and the positioning signals will be accessible to all and interpretable by any receiver in such a way as to calculate the information relating to its position. The status of privileged user is distinguished, however, by a guarantee of availability of the service and by ability to access additional services (right to be granted a guarantee of the degree of precision, for example). In a situation of military crisis, the system will function in protected mode and the transformation functions will be different from the identity and advantageously chosen randomly.

In one preferred implementation of the invention, the method comprises:

a prior stage of registration of a mission declaration including at least a route plan to be followed by the user, and each request from a user receiver including a copy of the latest positioning signals received by the receiver (the latter advantageously remaining in their form as transformed by the direct transformation function of the satellite from which each arises), the stage of verification of the privileged-user status comprises the sub-stages consisting in decoding the transformed positioning signals included in the request (by applying the appropriate reverse transformation functions to them), in deducing therefrom the position of the user receiver and in verifying that this position is in conformity with the declared route plan.

The method according to the invention may also comprise a prior stage of invoicing the user benefiting from the privileged-user status, in consideration for the delivery of the interpretation key and for the quality of service which will be provided to him during his mission.

Moreover, in one particular embodiment, the method according to the invention comprises a prior stage consisting in supplying an identifier to the user during a mission declaration by this user or in his name. The identifier assigned to each of the various privileged-user receivers navigating a route is then broadcast to the various user servicing stations to which it is likely to address a call request to receive the interpretation key.

In accordance with another particular embodiment, which it is, moreover, advantageous to implement in combination with the preceding one, the method according to the invention comprises a prior stage consisting in supplying an encryption code to the privileged-user receiver during its mission declaration, and then, all throughout the progress of the declared mission, this encryption code is used by the user servicing station which receives a request from this user to derive and send it the interpretation key which is necessary for it to interpret the positioning signals.

Such an encryption code may also be advantageously put to use in such a way as to allow authentication of the signals received by the user originating from the ground stations, consisting, for example, in carrying out, within the user receiver, a comparison between the encryption code which has been assigned to it (and which it knows) and the signal carrying the interpretation key received from the ground (from the user servicing station) in order there to verify the correct presence of a specific fragment accompanying the interpretation key.

Another advantageous method of ensuring verification of authenticity and of integrity of the positioning signals used consists in having the privileged-user receiver carry out a comparison between the signals received from the satellites and the signals received from the services station processing the said request, in order there to verify the presence of the same specific fragment accompanying respectively the positioning signal sent out by each satellite and the interpretation key addressed to the user receiver in response to its request.

According to yet further characteristics of the invention, the method moreover comprises the stages consisting in:

including, in each request calling for the interpretation key sent by the user receiver, a copy of the latest positioning signals received by the said receiver, having the transformed positioning signals, included in the request, decoded (by reverse transformation) within the ground stations, and deducing the position of the receiver therefrom, calculating a degree of precision of the said positioning signals as a function of this position and/or of the state of operational serviceability of the system, and addressing to the said receiver the information on the degree of precision thus calculated.

The method may also feature the advantageous characteristics according to which:

each of the requests calling for the interpretation key originating from a plurality of user receivers includes a copy of the latest positioning signals received by the receivers, the positioning signals included in each request in their form as coded by application of the direct transformation functions are decoded within user-service ground stations by application of the corresponding reverse transformation functions, in order to deduce therefrom the positions of the user receivers, and the positions thus calculated are communicated to a system-manager service with a view to exerting traffic control and/or to addressing a warning to at least some of the said receivers of the said plurality, for example in the event of a risk of collision with one another, or with a non-privileged third party, as appropriate.

Advantageously, the method according to the invention consists, moreover, in making provision for several classes or categories of privileged users, being distinguished from one another by the degree of precision of the guaranteed positioning information and/or by the supplementary services provided. To that end, provision may especially be made, in accordance with the invention, for a basic interpretation key delivered to any user having a right to at least a first privilege, for example a first degree of precision in interpreting the positioning signals, and a supplementary interpretation key granting access to a higher-level quality of service, especially via a better degree of precision, reserved for the users having the benefit of a second privilege. The two keys can be carried by the same signal, which is derived more or less complete by the services station handling the request from the user as a function of the nature or of the extent of the privilege to which he has a right, of his situation at the moment, or of surrounding circumstances. By way of example, the basic key will be intended for privileged civil users, such as airliners carrying passengers as distinct from road vehicles not requiring the same guarantees, whereas the supplementary key will be reserved for military users.

It emerges from the foregoing that, for the majority of the envisaged applications of the invention, it is preferable for the request calling to receive the interpretation key to comprise a copy of the positioning signals which the user receiver picks up at any instant, as they reach it from the various satellites of the constellation.

These recopied signals serve in particular for the ground network to determine the position of the user, for the purposes of monitoring and/or in order to assist him better during his transit under the coverage of the system. Upon each request, the services ground station finding itself in communication with the receiver of the user in question, to do so, processes these recopied signals by applying to them, in accordance with the interpretation key, the transformation functions which are the inverse of the direct functions currently valid in the various sending satellites. The relevant functions are in fact known to the services stations the latter being sent them regularly from the master station which calculates them.

The processing aiming to determine the position of the user is carried out in particular for the purposes of recognition of the privileged-user status or of any similar monitoring. It is therefore advantageous for the receivers, at least the privileged-user ones, to be constructed in such a way as automatically to repeat the sending of the call request to receive the interpretation key with a defined periodicity, to the extent that the recopy of the positioning signals is included in the request signal.

Via the same procedure, it is also possible to carry out monitoring of the users even when the system is operating in non-protected mode, that is to say when the positioning signals are interpretable by the non-privileged user receivers as well as by the privileged-user receivers. Provision may be made, in effect, to equip the non-privileged user receivers to be able periodically to perform a recopy of the positioning signals, even though they do not send any request with a view to an interpretation key, so as to allow monitoring of traffic from all the users under any conditions.

The method according to the invention preferably comprises the stages consisting in having positioning signals acquired anew, from the said plurality of satellites, by the user receiver, after reception of the interpretation key, physically represented by the set of relevant reverse transformation functions, and to have the latter applied to the positioning signals newly acquired in order to deduce new position information from them. This additional stage makes it possible to avoid the movement of the receiver during the propagation time of the signals and time for processing the requests acting to reduce the precision of the position information.

The presence of the recopied positioning signals in the request signal is also advantageously put to use, in accordance with the invention, in order to improve the security of the privileged users and to better guarantee the reliability of the system to which they are subscribing, by carrying out, whenever such a request is sent and processed, a stage of authentication of the positioning signals acquired which is carried out as has already been indicated above, so as to ensure that these signals have not been manipulated malevolently by a stranger to the manager of the system.

The characteristics of the various embodiments of the invention will now be described in more detail, referring to a particular practical embodiment.

We should stress here that the system of the invention can easily be constructed in all its elements in such a way as to ensure compatibility of the equipment with an existing navigation system, such as the GPS system. In the case of a combined system comprising present-day satellites and satellites according to the invention, it would be preferable, however, for the mode of operation in protected mode, for the positioning function to be devolved only to the satellites according to the invention, since the existing GPS satellites impose restrictions on the choice of the transformation functions (the transformation functions, in their case, can only be an arbitrary shift of the internal clock of each satellite of the GPS constellation, or, failing that, the identity function).

We should also stress that, although the management of the transformation functions should be handled overall by the satellite master-control station, the management of the control of the users and the granting of the interpretation keys may be carried out regionally. Consequently, for example, the recognition by a country of the privileged-user status may be limited to the boundaries and surroundings of this country, the services stations situated in another country possibly applying other eligibility criteria.

Each navigation satellite derives its positioning signal as in the known satellite-navigation systems, in particular as regards its internal-reference time and its orbital parameters, these data being communicated to it in the control signals which it receives from the ground stations. When the system according to the invention is functioning in what is known as protected-operation mode (implementing the method with interpretation key reserved for the privileged users), these data are transformed, before they are sent by the satellite, by a transformation function $T_i$, i being an order number allocated to the satellite in question.

This transformation function may be either an encryption function, which may be common to all the satellites, or multiple and specific to each satellite for better protection, or a mathematical transformation of the digital data to be transmitted. By way of example, one of the simplest transformation functions in accordance with the invention may be an arbitrary shift in the time reference of each satellite of order number i, which exhibits a known value different from one satellite to the other, the other data of the control signals remaining unchanged.

In practice, the transformation function $T_i$ applicable to each satellite is generated periodically, at time intervals which are regular or variable arbitrarily, possibly randomly, and broadcast by a security-protected data-exchange ground network, so as to be sent to the satellite in question by the most appropriate satellite-constellation ground control station. It is generated on Earth by the master station which, in a way which is in itself known, is part of the set of ground stations for control of the constellation of satellites.

The recovery by a user receiver of the correct navigation data requires knowledge by the receiver, for each satellite in its range, of the transformation function $T_i^{-1}$ which is the inverse of the one which was used on sending by this satellite. It is the set of inverse functions which is therefore necessary for the receiver which has been called here the interpretation key for the positioning signals.

The various reverse transformation functions $T_i^{-1}$ are known by the master station of the system, and they are sent, by way of the abovementioned security-protected data-exchange ground network, to ground stations here called user servicing stations (or services stations). These stations are specific to the system according to the invention, but they may, needless to say, consist of particular units integrated into the ground stations having the conventional function of control of the constellation of satellites and/or those tasked with monitoring the traffic from the users. Moreover, a bidirectional radio link is available at any instant between the privileged user and at least one ground user servicing station. This link is either direct or via a transponder, which may advantageously be placed on board a geostationary satellite or on board any other platform.

Each transformation function features an arbitrary validity duration, which the manager of the system (illustrated by the master ground station) can cause to vary either randomly or in a defined way, seeking especially to achieve a compromise between the quality of the security and the amount of traffic for the communications which more frequent alterations imply. By way of example, this validity duration may be several hours in peacetime and be brought down to several tens of minutes when danger such as a risk of military conflict is apparent. It forms part of information relating to the period of validity of the function in question, which includes the indication of its timetables, at the start date and end date of validity. This period of validity is always transmitted, on the one hand at the same time as the direct transformation function to the satellite which it concerns and, on the other hand, at the same time as the corresponding inverse function to the user receiver which has need of it in the interpretation key. It is applied by each navigation satellite by reference to the time of its own clock.

Furthermore, each reverse transformation function participating in the definition of the interpretation key is advantageously announced to the user servicing stations with an advance in time with respect to its application to the positioning signals which is optimized to allow the transfer of information and its simultaneous interpretation by the satellite and by the users.

It will now be explained how, when the services managing the system judge it desirable (for example in wartime in contrast to availability to all in peacetime), the current reverse transformation function $T_i^{-1}$ is transmitted only to the authorized privileged users and refused to the other users.

The status of privileged user is given to a user only for the duration and for the purpose of accomplishing a defined mission, which has to be declared and described to a user servicing ground station before he starts to use the service. The mission has then to be complied with in order for him to keep the privileged-user status. The mission declaration contains information such as the identity of the user, the type of vehicle, the departure point, the destination, the anticipated route, timetables of intermediate points, and the average speed between these points, and thus especially the information which defines a route plan. It should be noted, however, that this route plan may consist in maintaining an immobile position which the user should not leave.

One of the particular characteristics of the invention is that it makes it possible to make the GPS service chargeable by the mission. This may be particularly beneficial for the users, given that business clients pay only for a service which, at their end, generates revenues.

Once a privileged user has declared a mission and when the service has been invoiced to him, he obtains, from a user servicing ground station, an initial authorization for the use of the system. This initial authorization may advantageously be accompanied by an identifier (a code which designates the user for the radio communications or a call signal) and an encryption code. Transmission of the encryption code takes place either directly between a representative of the user servicing station and a representative of the user, or by way of a smart card containing the code which can be put in place in the receiver. This transmission takes place at the departure site (for example in the control tower of an airport or the harbormaster's office of a port).

The encryption code will be used for certain communications between the privileged user and the user servicing ground stations in the way described below. The encryption code is specific to each user and to each mission by a user. It is generated at random by the user servicing ground station, its validity is limited to the accomplishing of the mission, and the code as well as the identifier are of no further use after the mission has been accomplished.

The information on the privileged user, his mission, his identifier and his encryption code is sent by the security-protected ground communications network to all the user servicing ground stations which will have to communicate with him and to assist and/or monitor him in navigating his route.

In the course of the accomplishing of the mission, the receiver of the privileged user receives the signal from the navigation satellites in view. The privileged-user receiver establishes a radio communication with the closest services ground station. This communication preferably takes place by short-range radio in order to avoid saturation of the long-range communications frequencies. If that is not possible (for example over the oceans), communication is established by way of transponders installed on board geostationary satellites or on any other platform.

The privileged-user receiver sends its identifier at regular intervals to the services ground station and, for each satellite in view, sends the raw data originating from the satellite and the instant of reception, according to its internal clock.

Because the services station knows the reverse transformation functions which are current at the instant of reception by the user, as well as those which were in force in the recent past, it can calculate, from these data, the exact position of the user. This assumes that the clock of the user is synchronized with the reference time of the system. If that is not the case, for example at the start of a mission, this synchronization is established after several steps of the procedure and it then remains correct for the entire mission.

The user servicing ground station which thus determines the exact position of the privileged user thus knows his identity and his mission. It then verifies that the calculated position is in accordance with the declared mission.

If the position of the user does not correspond to the mission, the user may have need of assistance in order to come back onto his route. The user servicing station then makes contact with him for this purpose by radio.

If the user is not conforming to the instructions or if the discrepancies observed give rise to suspicion of potential danger (for example in the case of military installations if the services ground station observes that he is flying at supersonic speed toward a military installation although he has declared himself to be a subsonic transport aircraft), his privileged-user status is revoked. In certain critical cases (for example, detection of an attack by missiles using the system), it is even possible to send falsified data specifically to this user in order to divert him from potential targets.

If the position of the user remains fixed without plausible explanation or if his radio broadcast is interrupted abnormally, the user may be in a critical situation. Radio contact is then attempted and rescue action is put in hand.

When it is observed that the privileged user is in conformity with his mission, the user servicing station prepares a set of data to be addressed to him. This set of data contains the interpretation key for the positioning signals, in the form of the reverse transformation functions corresponding respectively to the various satellites lying within range of the user, as and when they are applicable as a function of their respective validity periods.

The services station encrypts this set of data by using the personal encryption code which was supplied to the user at the moment when he registered as a privileged user. The services station closest to the privileged user at the desired moment transmits a message to him containing the identifier of the privileged user and the set of encrypted data.

The privileged user receives the set of data, decrypts the reverse transformation functions and applies them to the signals which he receives from the satellites. The resulting date are the bases of the calculation of the current position of the user (position in space and in time), which is carried out according to the known GPS procedures.

As for any satellite-navigation system proposed to date, the precision of the system depends on the configuration of the constellation of satellites in the sky, which varies according to the ephemerides of the satellites over time. This precision decreases, moreover, as a function of the latitude and of local obstacles upsetting the propagation of the signal (for example, the precision available on a runway situated at the bottom of a valley may be mediocre because few satellites are in view). The best precision which can be guaranteed to the users at any instant and over the entire globe (assuming that the signal is available) is therefore necessarily very low. In order to be able to guarantee good precision to the privileged users, the invention makes provision to assign a guaranteed precision value to each place and to each instant at which this value is specifically applied.

The user servicing stations are not generally uniformly distributed, but they are, on the contrary, preferably concentrated in areas of heavy traffic. These areas are also those where critical operations or events will have the highest chance of occurring. It is consequently advantageous to equip them with means making it possible to enhance the precision of the system. This ran be done by applying the known technique of differential GPS (with which the invention is fully compatible) and by using local equipment of known type (such as that of a pseudolite), distributed in the same ground network with the user servicing stations and situated, for example, in large ports or airports. The resultant precision can thus be made excellent in the vicinity.

The certification authorities take care to verify that the design and the operation of public-transport systems are safe for the passengers and populations on the ground under predefined operating conditions. When security depends on a partially random parameter, the worst-case hypothesis is taken into account. Consequently, if the system according to the invention is used for public-transport operations, it is preferable to give each user a guarantee as to the precision applied to his particular situation rather than a guarantee which is valid in all cases, which will necessarily be mediocre. We should recall here that a guarantee is in any event impossible in the existing GPS system since the very availability of the signal cannot be guaranteed.

With the system according to the invention, a guarantee of precision can be given only to a privileged user upon a specific request (this service even being chargeable). The privileged user specifies the duration for which he will have need of a guarantee as to the minimum precision of the system (which will be granted to him provided that he conforms with his declared mission). This duration covers the duration of the critical operations envisaged.

The user servicing ground station which receives the request knows the position and the intentions of the privileged user. It knows the current disposition of the constellation of satellites and the way in which it will evolve in the near future. It knows the environment in which the user will be navigating (ground obstacles). It also knows the operating status of the system as a whole, and in particular of the local systems for increasing precision (operational or defective). On the basis of all of this data, the station can supply a reliable prediction on the minimum precision of the system for the duration required by the user. It is therefore possible to announce a reliable degree of precision without having to issue systematically unfavorable assumptions.

The combination of the guarantee of availability of the navigation system for the duration of the operations with a personalized estimate of the guaranteed minimum precision enables certification of the system, even under the strictest conditions.

BRIEF DESCRIPTION OF THE DRAWINGS

There will now be described by way of non-limiting example, a particular embodiment of a system implementing the invention, by making reference by the diagrammatic drawings attached, which form an integral part of the present description and in which.

DESCRIPTION OF PREFERRED EMBODIMENT

Figure 2:
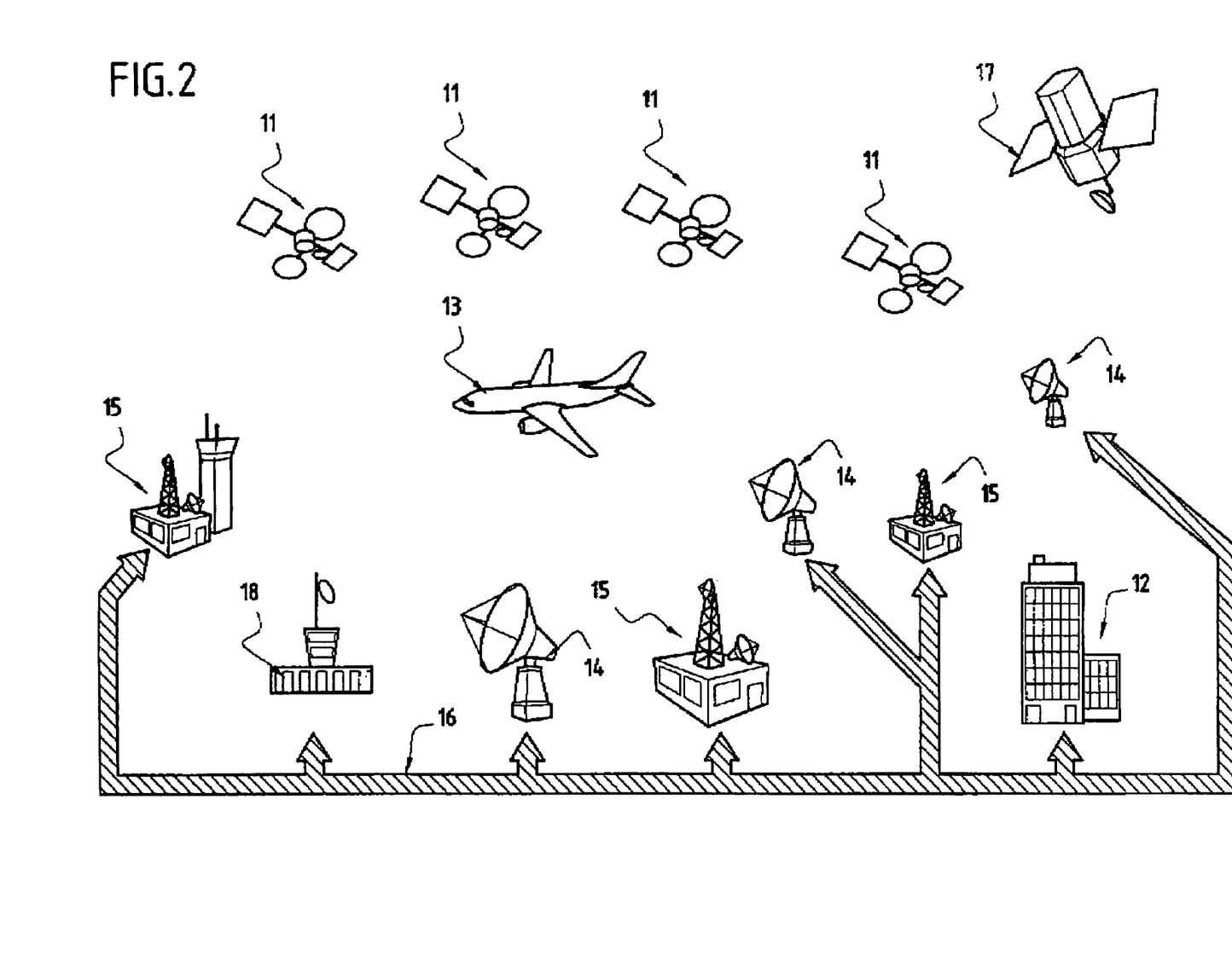
FIG. 2 illustrates the components of a security-protected system according to the present invention.

The system represented in FIG. 2 differs little, in its main hardware components, from the conventional GPS system of FIG. 1.

The space segment consists of a constellation of satellites 11, which send out the positioning signals under the control of the ground segment. The ground segment comprises a master station 12 and a set of other control stations 14, which are in communication with each other and with the master station via a security-protected data-exchange network 16. The user segment comprises the set of user receivers which are installed on board vehicles such as the aircraft 13 in order to pick up and interpret the positioning signals reaching them from the space segment.

The ground stations, other than the master station 12, however, are of two types here. The stations 14 for control of the constellation of satellites provide a relay, in a known way, between the master station 12 and the various satellites 11, by sending the latter control signals from which they deduce the positioning signals, namely essentially their orbital parameters as well as synchronization signals.

Other ground stations constitute stations 15 known as user servicing stations (or services stations). They provide a link between the user receivers and the ground segment. In the case of the preferred embodiment chosen to illustrate the invention, the services rendered by them to the users comprise a navigation-assistance service, a service of guarantee of precision of the calculation of their position, a service of monitoring of the air environment.

Needless to say, the ground control stations 14 and the services ground stations 15 can, in certain cases, be physically combined.

As in the conventional systems, provision can be made for geostationary satellites such as 17, which have the function of enhancing the precision of the system by making available to the users positioning signals and signals on the integrity of the system as a whole which they derive from signals picked up directly from a ground station with which they remain continuously in contact. They thus allow the user to know the operational status of the system.

Stations called "pseudolites" 18 have also been depicted. The stations of this type are also known in themselves for the purposes of enhancing the precision of the information delivered directly to the users who are approaching them, by providing operation in what is known as "differential" mode, their position being known precisely in their immediate environment.

The equipment which is specific to the invention employs the data-transfer protocol implemented in accordance with the method of the invention, which proceeds, in its main stages, as set out below with the aid of FIGS. 3 to 7.

In the course of the first stage (FIG. 3), the user 13a, making ready to take off from an airport and requesting access to the privileged services of the system, declares his mission (objective, route plan, timescales to be adhered to) to a user servicing ground station 15 which is represented combined with the control tower. He is then invoiced, and he receives an identifier code and an encryption code. It will be noted here that the mission may, as appropriate, ask to receive the service from a specific department, or be declared in advance and/or by way of an accredited representative, its declaration is interpreted, when the system is in operation, in accordance with the method of the invention, as an initial request signifying that the user intends to take advantage of his privilege of access to the enhanced services.

Figure 3:
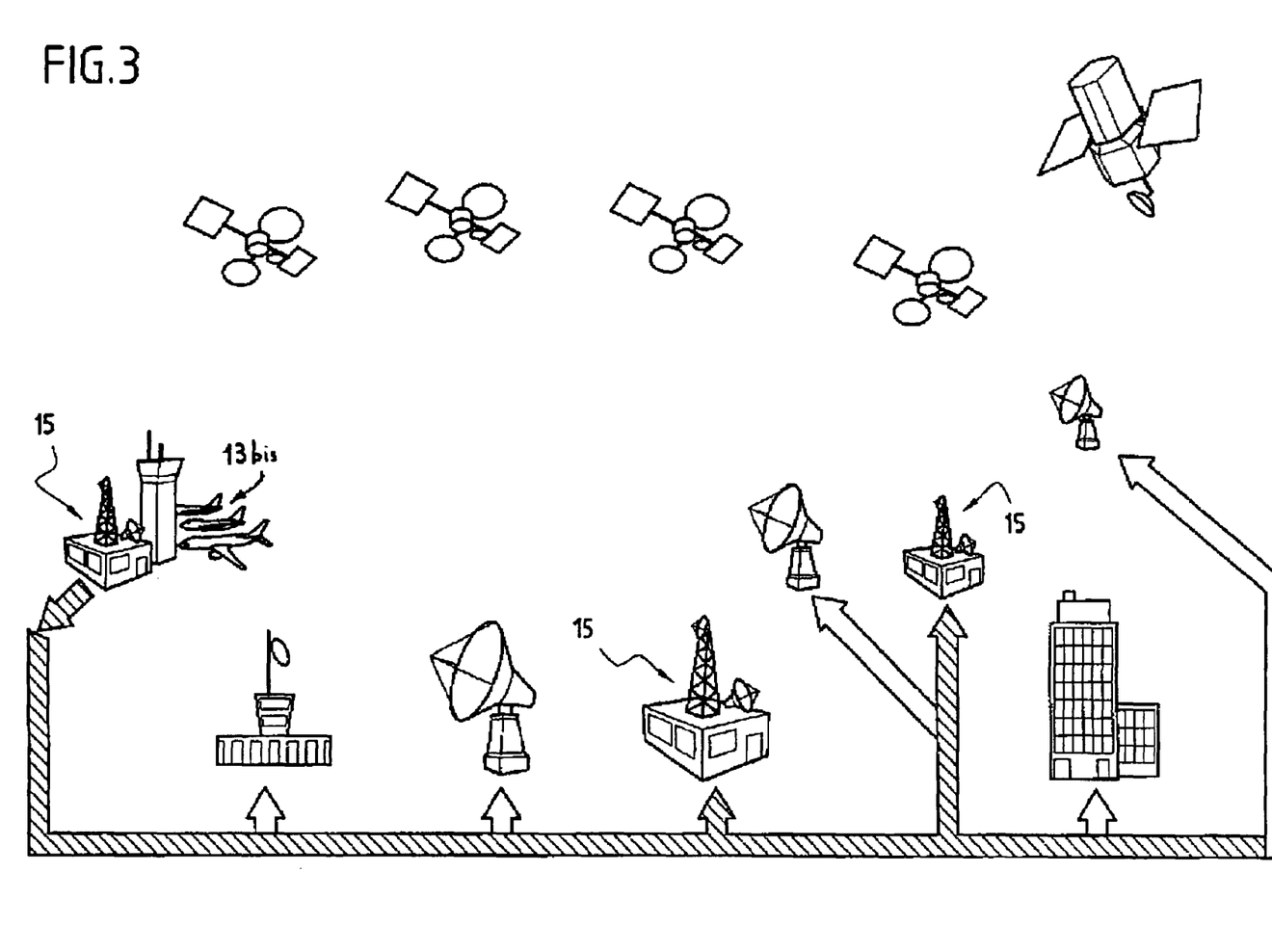
FIGS. 3 to 7 show the successive stages of the data-transfer protocol in the system of FIG. 2.

The station 15 having received this initial request transmits the details of the mission as well as the identifier and the encryption code, by way of the security-protected data-exchange ground network 16, for registration by the other services stations 15 which will have to communicate with the user in the course of his mission, that is to say those which will have to monitor his movements all throughout his journey in the area of coverage of the system. All verifications desired by the manager of the system may already have been carried out at this stage, before the particular user is considered as having a right to the status of privileged user.

Periodically (FIG. 4), but at variable time intervals, the master ground station 12 randomly generates a set of direct transformation functions $T_i$ which are each intended individually for one of the various satellites 11 in order to be applied there to the positioning signals which each respectively makes available to the user receivers. These transformation functions are addressed to the respective satellites by way of the network 16 and of the appropriate ground control stations 14.

Figure 4:
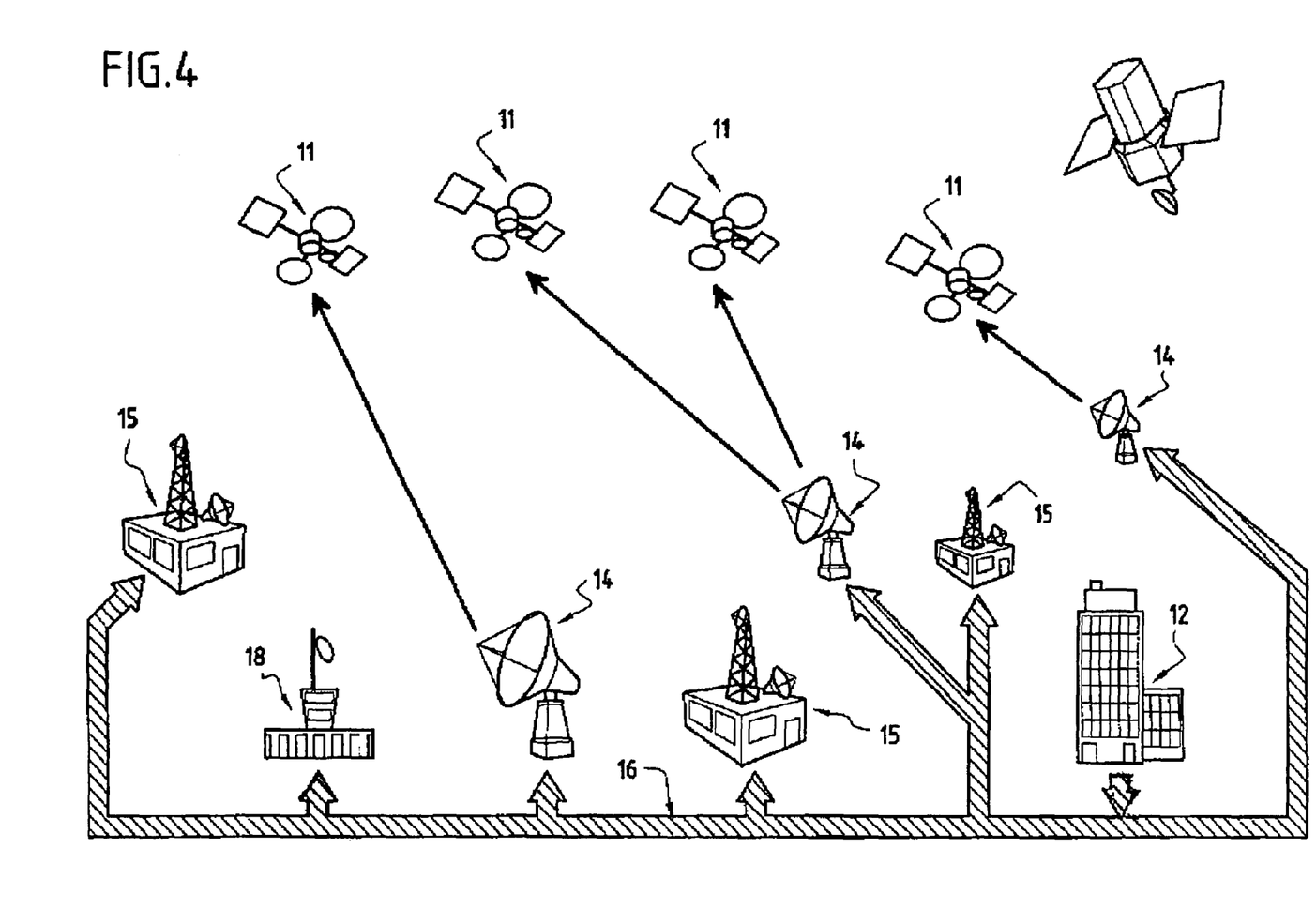

Moreover, the transformation functions which are the inverse of the preceding ones, which are designated $T_i^{-1}$, are also determined by the master station 12, and they are transmitted, by way of the network 16, to the various services ground stations 15. In the data signals transmitted, respectively to the satellites and to the user receivers, the direct and reverse transformation functions are associated with all information of use as to their period of validity (start and finish timetables in absolute time).

When a user 13 wishes to obtain information on his position (FIG. 5), he sends the request to do so via a request signal to be picked up by the services stations of the ground network and he collects, via his receiver, the positioning signals coded by the transformation functions $T_i$ as they are sent by at least four satellites 11 located within data-transmission range of him.

Figure 5:
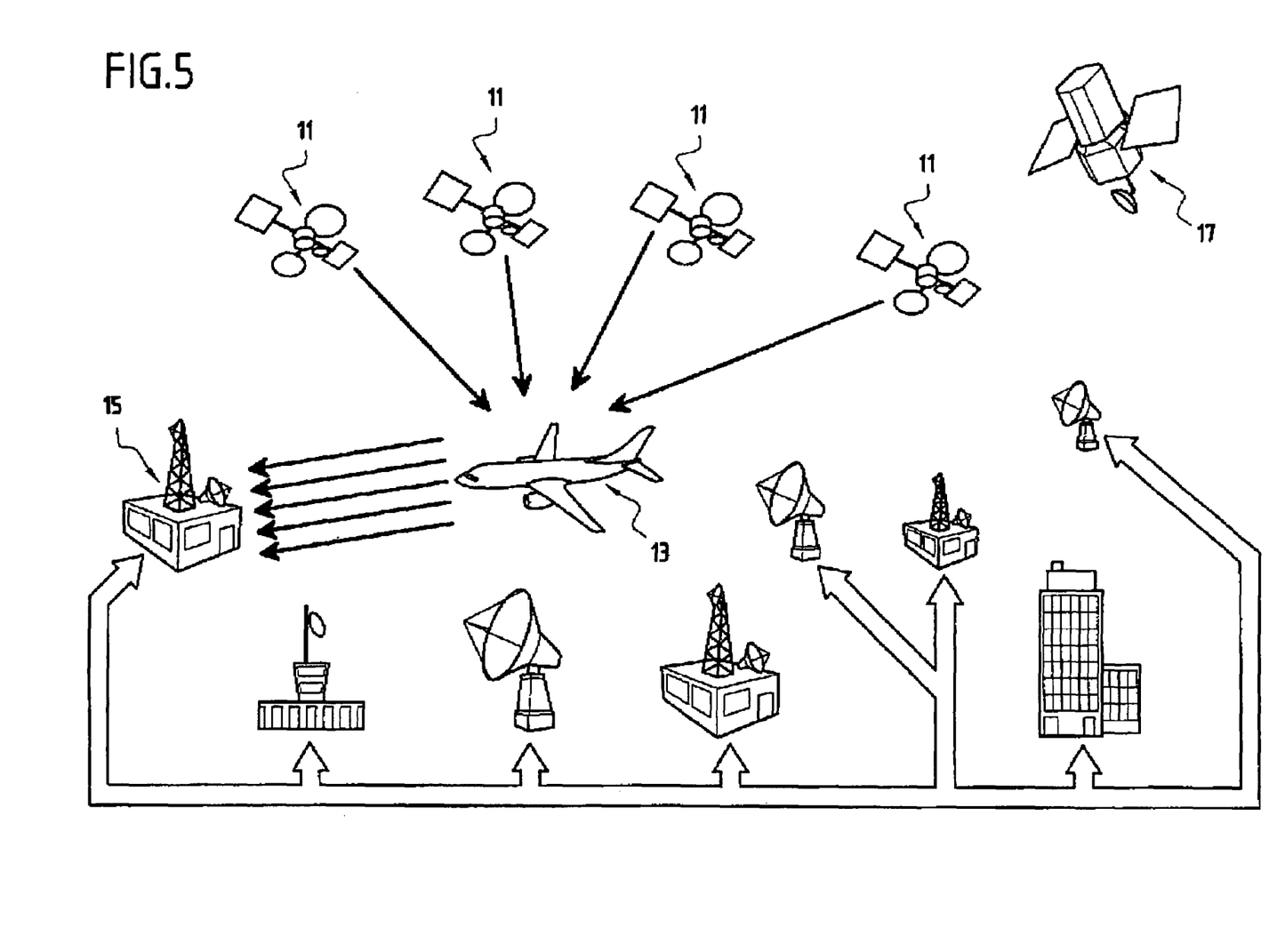

In the request signal, the user receiver repeats the transformed positioning signals which it has picked up, as well as the time from its internal clock, intended for a services ground station 15, in principle the one which is closest to it. This communication can be carried out by way of a transponder, which bears the reference 17 here, assuming that it is arranged on a geostationary satellite.

The services ground station 15 determines the position of the user 13 (FIG. 6), using, to that end, all the reverse transformation functions $T_i^{-1}$ which may be necessary in order to interpret the signals having undergone the direct transformation within each satellite involved. The signal processing operations carried out in this station supply the elements for verification that the position thus calculated is in accordance with the mission of the user, put another way that the latter is able to retain the privileged-user status which was granted to him upon his mission declaration.

Figure 6:
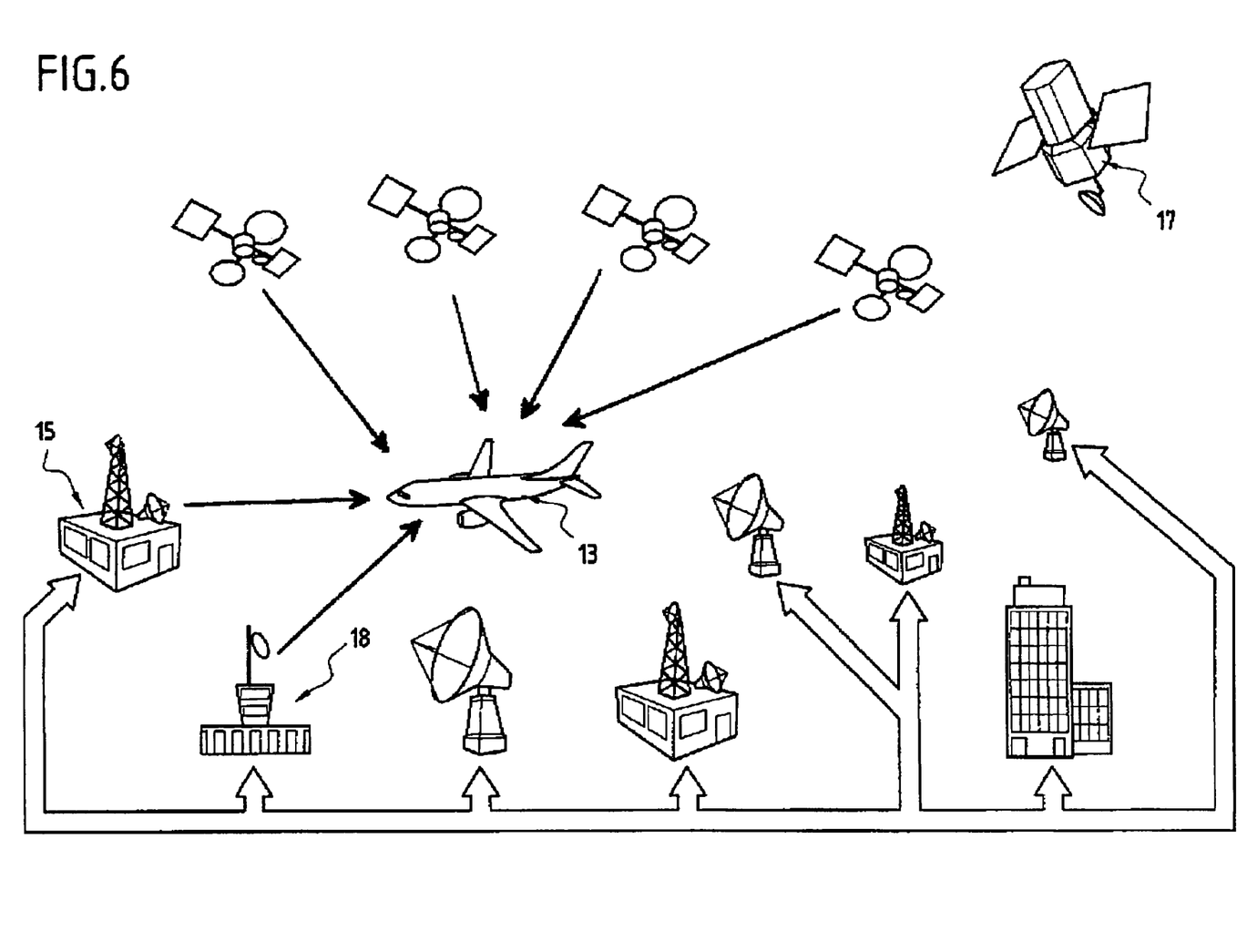

Subject to the comparison confirming that the mission is being complied with at this stage, or, at least, in general, subject to this verification being positive as far as the route plan is concerned, the services station 15 (in general, the same one) addresses the reverse transformation functions which it needs to the user receiver 13, by using the personal encryption code of this user. As for the relationships between user receiver and ground station in the other direction, the transponder 17 may be used in the course of this stage.

The user receiver then carries out a second acquisition of the positioning signals. By interpreting these latter signals, knowing, from now on, the reverse transformation functions in force, at least those which correspond to the inverse of the various functions which were applied by the satellites from which it picked up the positioning signals, the receiver determines the position of the user. This determining of the position information recovered at the user possibly involves differential positioning information originating from pseudolites 18.

It is reiterated here that the signals conveying the direct and reverse transformation functions are advantageously processed in such a way as to take into account the path delays between the elements of the system. The time stamping of the period of validity of the data relating to the transformation functions makes reference to the absolute time of the system on the sending of the signal from the satellites 11.

Figure 7:
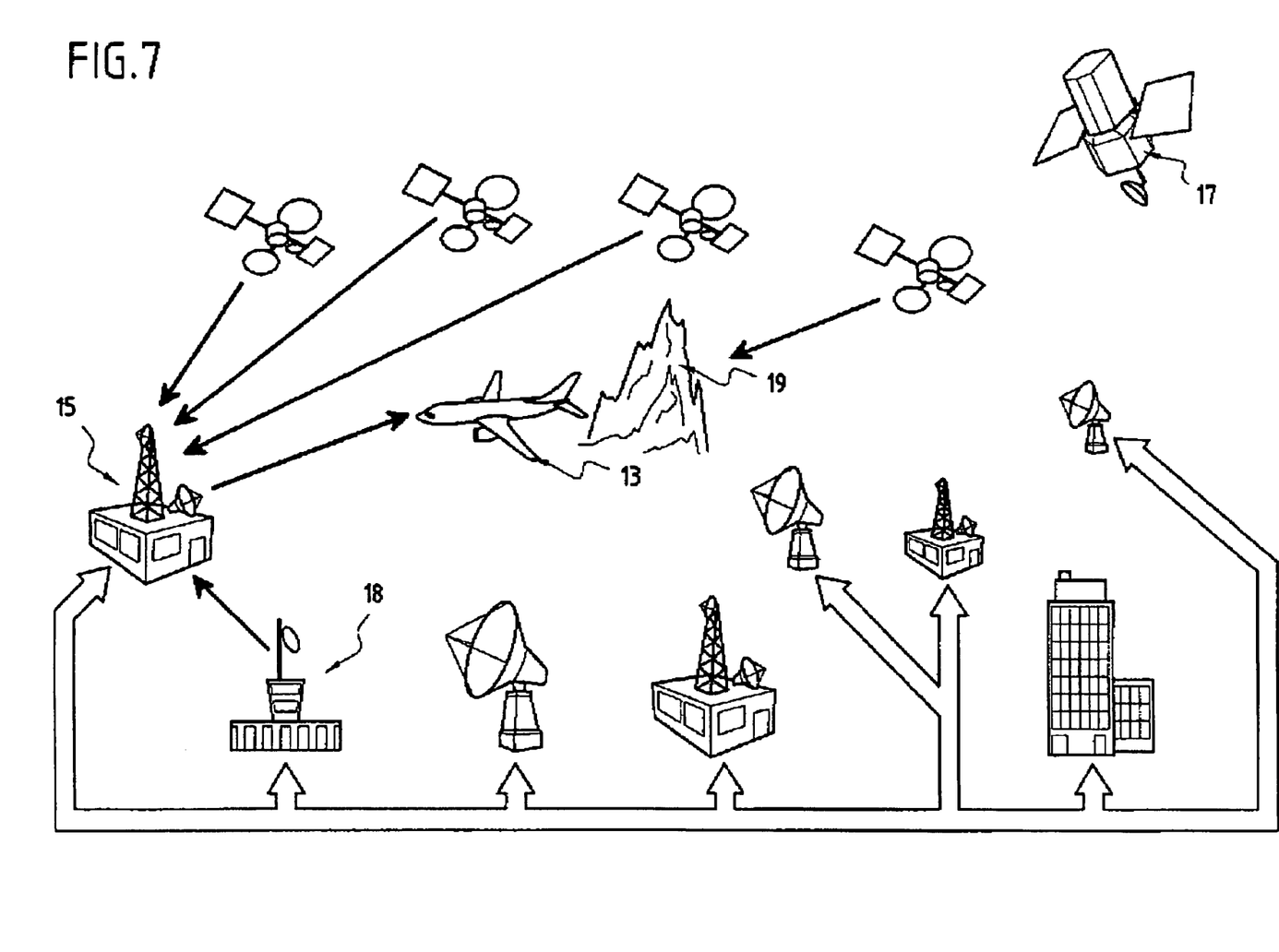

As shown in FIG. 7, the services ground station 15 can also calculate precision information having regard to the position of the user 13 and any obstacles 19 to the propagation of the positioning signals. This information is communicated to the user, possibly by way of a transponder 17.

Figure 8:
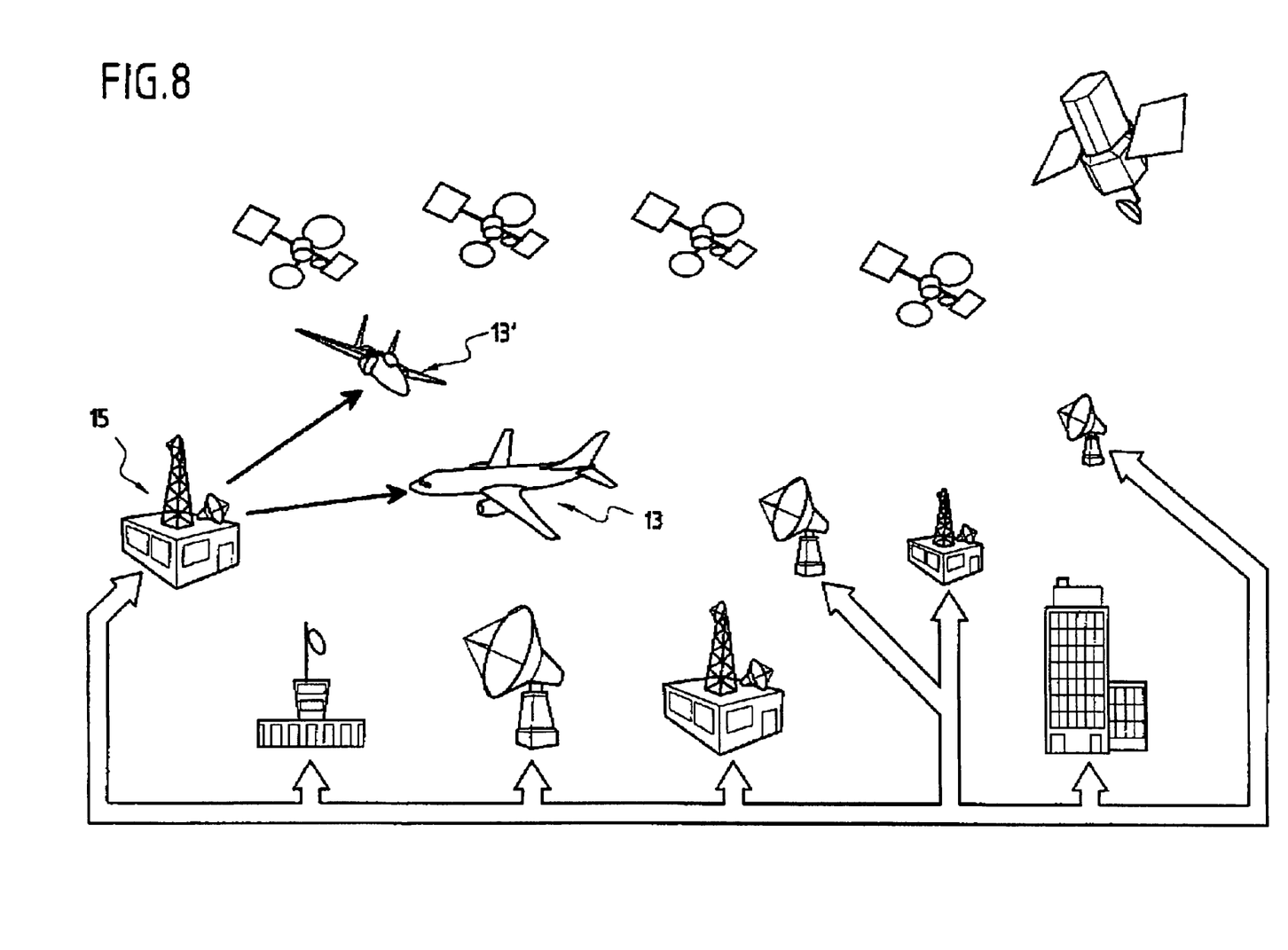
FIG. 8 represents a supplementary use of the system of FIG. 2.

Finally, as shown in FIG. 8, the services ground station 15 can take into account the positions of several users 13, 13' and communicate to each the position of the others as well as alarm signals in the event of a risk of collision. This function can be combined with that of air-traffic control.

A final figure completing the present description (FIG. 9) shows, in another form, the essential elements of the navigation system according to the invention in their mutual data-transfer relationships. It is assumed, needless to say, that all the signal-processing facilities are in being for performing the operations according to procedures which are otherwise conventional in themselves, having recourse to data-processing technologies.

Figure 9:
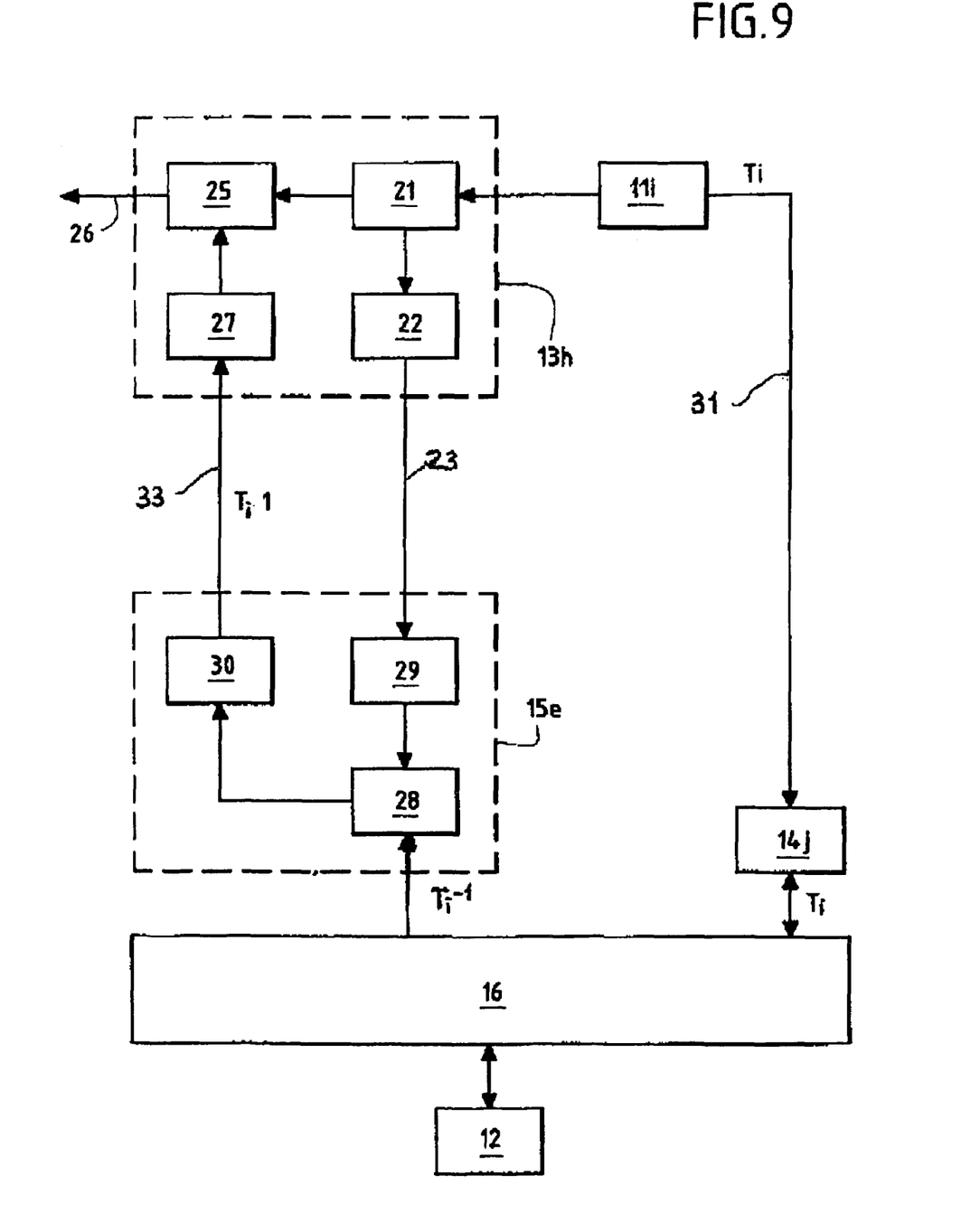
FIG. 9 reiterates, in diagrammatic form, the essential facilities of a navigation system answering to the invention in their functional relationships.

In this figure, the reference numerals used previously have been retained. Thus the ground communications network 16, the master station 12, a station 14 for control of the constellation of satellites, assumed to be of order j, a satellite 11 assumed to be of order i, are again seen. The main elements specific to the invention are set out, on the one hand, as a user receiver 13 of order h, and, on the other hand, as a user servicing station 15, assumed to be of order e.

As is in itself conventional, each satellite 11 follows an orbit around the Earth which is specific to it and which is represented by orbital parameters which are determined, on the ground, by the ground control stations 14 retransmitting the data calculated within the master station 12 (line 31), and it sands out positioning signals 32 which contain the data characteristic of its spatial position and of the time with respect to an absolute reference system.

Within the user receiver 13 of order h (13h), various signal-processing units have been shown symbolically, grouping together the facilities which it includes. A first unit, or acquisition unit 21, includes all means which are of use in picking up and shaping the positioning signals received. Another unit constitutes the request-sending unit 22; it receives the signals from the acquisition unit 21 and derives the signal to be adopted as request signal 23 for transmission to the ground network. The same information is transmitted to a unit 25, also integrated into the means specific to the user receiver, which has the function of calculating the position of the user at the instant in question. It produces a signal 26 which is available for displaying the position of the user or for being otherwise made use of by the other equipment present on board the aircraft.

In accordance with the invention, the calculations to be carried out in the unit 25 imply knowledge of a key for interpreting the positioning signals to be received from a user servicing station on the ground network in response to the call of the request.

Within the services station 15 of order e (15e), the system, in a receiving unit 29, includes means for recording the request signal 23 received from the user receiver 13h, including in the recopied information which it transports relating to the time references and the positioning signals acquired by it. The output signal from this request-receiving unit 29 is transmitted to a calculating unit 28 in which the verification of the privileged-user status is carried out, essentially by comparison of the data communicated via the request signal with the data of the user-specific mission in question which have previously been recorded on the basis of information transmitted via the network 16.

The signal coming from the calculating unit 28 is transmitted to another calculating unit 30 of the same services station 15e, which derives the interpretation key required by the user receiver and sends it (33) to the latter, subject, needless to say, to the verification of his privileged-user status having given a favorable result. This key, necessary for interpreting the positioning signals, is represented essentially by the reverse transformation functions $T_i^{-1}$ applied by the satellites (at least in the case of those the positioning signals of which are accessible to the user receiver in question), processed by virtue of the encryption data and accompanied by the user-specific identifier, as well as any indications as to the precision of the information and the presence, if appropriate, of other users in immediate proximity.

This interpretation key 33 in a way constitutes an access authorization, to the extent that it gives the user the capacity of using the navigation system with the qualities of service, especially as regards degree of precision of the calculated position, which are accorded to the privileged users. It is registered by the user receiver in a receiving unit 27.

A verification of authenticity or of integrity of the code received can be carried out there, before transmission to the position-calculating unit 25. This will involve, for example, having the user receiver carrying out the reverse transformation recognize whether the signal received from a given satellite correctly includes a specific fragment, just as it should be present (in addition to the part of the signal transmitting the positioning information having undergone the transformation) in order to have been added thereto, within the satellite, by recopy of the same fragment from control signals received by this satellite, accompanying those transmitting to it the direct transformation function generated by the master station. If appropriate, this authentication can also involve the encryption code specific to the user receiver, the one which was assigned to it upon its mission declaration and which can be used, within the services station with which it is in communication, to encrypt the interpretation key as well as the specific signal fragment re-transmitted without inversion and accompanied by reverse transformation functions also generated by the master station.

The preceding description, as a whole, confirms that the invention makes it possible to achieve the objectives which it sets itself, although it is not limited to the examples and variants which have been more particularly considered. It will have been understood, in particular, how the system according to the invention allows those users having paid the fee to be given continuous access to authentic positioning signals, delivered on demand with a personalized and guaranteed precision, and, as an option, to be alerted when the trajectory of other users presents a potential danger.

The invention claimed is:

1. A method for satellite positioning using positioning signals which are sent out by the various satellites of a satellite constellation under the control of a set of ground stations from which said satellites receive control signals, and which are available to be picked up by a plurality of user receivers, comprising:
   emitting, from said set of ground stations, periodically renewed direct transformation functions which are addressed respectively to each satellite of said satellite constellation and applying the direct transformation function received by each satellite to encode the positioning signals emitted therefrom;
   verifying that a user receiver has a right to a privileged-user status upon each request from the user receiver addressed to a user servicing station and, in the event that the verification is positive, addressing to said user receiver reverse transformation functions that are inverse to the direct transformation functions applied at the satellites from which said user receiver receives positioning signals, wherein said reverse transformation functions include an interpretation key for interpreting said positioning signals by applying said reverse transformation functions for decoding them.

2. The method as claimed in claim 1 comprising:
   registrating before said emitting and verifying a mission declaration comprising a route plan to be followed by the user,
   wherein each request from a user receiver calling for said interpretation key includes a copy of the latest coded positioning signals said user receiver has picked up from the satellites,
   and wherein the verifying of the privileged-user status comprises the sub-stages including decoding the coded positioning signals included in said request, deducing therefrom the position of the receiver, and verifying that this position is in conformity with the route plan.

3. The method as claimed in claim 1, further comprising:
   supplying before said emitting and verifying an identifier code which designates the user for a declared mission to the user during a mission declaration by this user, and wherein said identifier code is broadcast to various user servicing stations to which said user receiver is likely to address a request calling for the interpretation key.

4. The method as claimed in claim 1, comprising:
   supplying before said emitting and verifying an encryption code to the user during a mission declaration by this user, wherein the user servicing station receiving said request uses said encryption code to send the interpretation key to the user receiver.

5. The method as claimed in claim 4, wherein said encryption code is used for an authentication process carried out by the privileged-user receiver by comparison between the signal carrying the interpretation key received from the user servicing station in response to said request and said encryption code, the encryption code being known to the privileged user.

6. The method as claimed in claim 1, further comprising a preliminary stage of invoicing the user benefiting from the privileged-user status.

7. The method as claimed in claim 1, wherein the method further comprises:
    comparing by the privileged-user receiver between the signals received from the satellites and the signals received from the services station processing said request, in order to ensure verification of authenticity and integrity of the positioning signals interpreted, and to verify the presence of the same specific fragment respectively accompanying the positioning signals sent out by each satellite and the interpretation key addressed to the user receiver in response to the request from the user receiver.

8. The method according to claim 1, further comprising:
    including, in each request calling for the interpretation key sent by said privileged-user receiver, a copy of the latest positioning signals received by said receiver, in their transformed form,
    decoding at the ground stations the transformed positioning signals included in said request, and deducing the position of said receiver therefrom,
    calculating a degree of precision of said positioning signals as a function of said deduced position and/or of an operational state of the system, and
    addressing to said receiver an information of the degree of precision obtained by said calculating.

9. The method of claim 1, wherein each request originating from the plurality of user receivers includes a copy of a latest coded positioning signals received by the receivers, and further comprising:
    decoding the transformed positioning signals included in each request,
    deducing therefrom the positions of the various corresponding receivers, and
    addressing to at least some of said plurality of user receivers a position information relating to other users among said plurality of user receivers.

10. The method of claim 1, wherein each request originating from a plurality of user receivers includes a copy of the latest coded positioning signals received by the receivers, and further comprising:
    decoding the transformed positioning signals included in each request,
    deducing therefrom the positions of the various corresponding receivers, and
    addressing to a traffic control service a position information relating to the position of at least some of said plurality of user receivers.

11. The method of claim 1 wherein a basic interpretation key is delivered to any user having a right to at least a first degree of precision in interpreting the positioning signals, and a supplementary interpretation key granting access to a higher-level quality of service, especially via a better degree of precision, is reserved for the users having the benefit of a second privilege.

12. The method as claimed in claim 1, wherein each transformation function participating in the definition of the interpretation key is announced to the user servicing stations with an advance in time with respect to its application to the positioning signals sent out by the corresponding satellite.

13. The method as claimed in claim 1, wherein the request signal for the interpretation key sent cut by the user receiver and intended for a user servicing station comprises a copy of the positioning signals emitted from a plurality of satellites as received by said user receiver, and wherein the copy signals are processed by said user servicing station applying to them said interpretation key to determine the position of the said user receiver for recognition of the privileged-user status or for any other monitoring purpose.

14. The method as claimed in claim 13, further comprising:
    acquiring again positioning signals by the user receiver from said plurality of satellites after reception of said interpretation key including the set of relevant reverse transformation functions,
    applying the set of relevant reverse transformation functions to the positioning signals newly acquired, and
    deducing from the newly acquired positioning signals a new position information, thereby avoiding that a movement of the receiver during the propagation of the signals and the processing of the requests result in reducing the precision of the position information.

15. A system for positioning by satellites in a security-protected system for assisted navigation, comprising
    a constellation of orbiting satellites, each including means for emitting positioning signals deduced from control signals which they receive from a set of ground stations, the ground stations being in communication with each other,
    wherein, for at least one user receiver having means for acquiring and interpreting said positioning signals, in order to calculate a position information, said user receiver further comprises emitting means for sending to said set of ground stations a request signal calling for an interpretation key which is necessary for said user receiver to have access to a privilege in using said positioning signals which is reserved for privileged users, and
    wherein said set of ground stations comprises at least one user servicing station including receiving means for receiving said request, calculating means for verifying, using said request whether the user for said user-receiver possesses a privileged-user status allowing him to said privilege, and emitting means for addressing said interpretation key to said receiver, in the event that the verification is positive.

16. A positioning system as claimed in claim 15, wherein each privileged-user receiver further comprises:
    means for receiving the interpretation key addressed to user receiver from said services station in response to its request, and
    calculating means for combining said positioning signals with said interpretation key and deducing therefrom said position information.

17. A positioning system as claimed in claim 15, wherein said interpretation key includes defined reverse transformation functions which are the inverse of direct transformation functions applied respectively by the various satellites within range of said user receiver for emitting the positioning signals sent therefrom.

18. A positioning system as claimed in claim 17, wherein a master station among said set of ground stations comprises:

means for generating the direct transformation functions to be applied at said satellites for deriving said positioning signals and addressing to the various satellites for which they are respectively intended, in addition to the usual control signals such as their orbital parameters and synchronization information, and means for calculating said reverse transformation functions and for broadcasting them any user servicing station within the system for using them in deriving and transmitting the interpretation key necessary to each user receiver sending a request to that effect, subject to the verification that the corresponding user is allowed the privileged-user status.

19. A user receiver for use in a satellite-navigation system enabling to reserve an access privilege to privileged users in at least one geographical area covered by the system, which, in addition to means for acquiring positioning signals from a plurality of satellites within a range of the user receiver, includes:

request emitting means for sending to a user servicing ground station a request signal calling for a key for interpreting said positioning signals, said key comprising reverse transformation functions for inversing direct transformation functions which are applied respectively by the various satellites in the range of the user receiver for emitting the positioning signals sent therefrom, and calculating means for processing said positioning signals having undergone the direct transformation functions by applying to them the corresponding reverse transformation functions in said interpretation key, once said positioning signals have been received, and for deducing therefrom a position information obtained by interpreting said positioning signals.

20. A user receiver as claimed in claim 19, further comprising:

means for automatically repeating the emission of said request signal with a predefined periodicity.

* * * * *